United States Patent
White et al.

[11] Patent Number: 5,394,446
[45] Date of Patent: Feb. 28, 1995

[54] UNCOUPLING ROD CENTERING GAUGE

[75] Inventors: Thomas W. White; Edward W. Saxon; Robert S. Tsukida, all of San Jose, Calif.

[73] Assignee: General Electric Company, San Jose, Calif.

[21] Appl. No.: 135,811

[22] Filed: Oct. 12, 1993

[51] Int. Cl.⁶ .......................................... G21C 17/00
[52] U.S. Cl. ............................... 376/245; 376/233
[58] Field of Search .............. 81/3.41, 3.42; 376/233, 376/260, 245

[56] References Cited

U.S. PATENT DOCUMENTS

| | | | |
|---|---|---|---|
| 4,028,811 | 6/1977 | Hutter et al. | 33/174 L |
| 4,158,600 | 6/1979 | Akimoto et al. | 376/260 |
| 4,292,131 | 9/1981 | Suzuki | 376/260 |
| 4,489,036 | 12/1984 | Jamrus | 376/229 |
| 4,521,370 | 6/1985 | Fischer et al. | 376/23.3 |
| 4,671,518 | 6/1987 | Retz | 277/1 |
| 4,793,056 | 12/1988 | Kurokawa et al. | 29/726 |
| 5,031,816 | 7/1991 | Kwech | 228/18 |

*Primary Examiner*—Donald P. Walsh
*Assistant Examiner*—Meena Chelliah
*Attorney, Agent, or Firm*—J. E. McGinness

[57] ABSTRACT

A gauge for ensuring that the uncoupling rod of a control rod drive is properly inserted in the center hole of the spud and not in one of the outer lobes, i.e., spud flow holes, which communicate with the center hole. The uncoupling rod is inserted in the spud. Then the gauge is placed on top of the spud with a centering ring protruding into the spud. The uncoupling rod is correctly installed if it is free to slide inside the gauge and the spud. The gauge is also provided with a ring to protect the spud during transfer of the control rod drive.

13 Claims, 5 Drawing Sheets

UNCOUPLING ROD CENTERING GAUGE

FIELD OF THE INVENTION

This invention relates generally to maintenance of a control rod drive of a boiling water reactor. Specifically, the invention relates to tools for dismantling or assembling a control rod drive during a maintenance operation.

BACKGROUND OF THE INVENTION

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch (152.4-mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains an insert port 66, a withdraw port 70 and an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, reactor pressure is admitted to the two-way check valve from the annular space between the CRD and a thermal sleeve (not shown) through passages in the CRD flange, called scram vessel ports. The check valve directs reactor pressure or external hydraulic pressure to the underside of drive piston 24.

Referring to FIGS. 2A and 2B, the CRD further comprises an inner cylinder 57 and an outer tube 56, which form an annulus through which water is applied to a collet piston 29b to unlock index tube 26. The internal diameter of inner cylinder 57 is honed to provide the surface required for expanding seals 65 on the drive piston 24. A collet housing 51 (which is part of outer tube 56) is provided with ports 73 to permit free passage of water from the clearance space between the outer diameter of index tube 26 and the inner diameter of inner cylinder 57 and the inner diameter of collet housing 51. The bottom of collet piston 29b normally rests against a spacer 52 in the upper portion of the annular space. Grooves in the spacer permit the passage of water between the bottom of the collet piston 29b and the passage area within the cylinder, tube and flange.

Welded pipes 80 and 81, installed in the CRD housing, port water to the insert port 66 and the withdraw port 70 respectively. A port 69 below outer tube 56 connects to withdraw port 70 in CRD flange 6 so that water is applied through the annulus to collet piston 29b when a withdraw signal is given.

The CRD is secured to the CRD housing flange 10a by eight mounting bolts (not shown). A pressure-tight seal is effected between the mated flanges by O-ring gaskets (not shown) mounted in a spacer 7 secured to the CRD flange face.

Insert port 66 contains a ball check valve which consists of check-valve ball 20, ball retainer 21, and retainer O-ring 22. This valve directs HCU accumulator pressure or reactor pressure to the underside of drive piston 24 during scram operation. Port 66 is connected internally to the annulus and the bottom of drive piston 24 and serves as the inlet for water during normal insertion or scram. Water enters this port for a brief period in response to a withdraw signal to move the index tube 26 upward so that collet fingers 29a are cammed out. Following this brief unlocking period, water from below drive piston 24 is discharged through port 66 and through the under-piston hydraulic line for the duration of the withdraw signal. During the time the CRD remains stationary, cooling water passes through an annulus internal to flange 6 to the area between outer tube 56 and the inside of the thermal sleeve to cool the CRD.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port in CRD flange 6 to the annular space between outer tube 56 and inner cylinder 57 for application to the bottom of collet piston 29b.

The locking mechanism consists of collet fingers 29a, collet piston 29b, barrel 35, guide cap 39, and collet spring 31. The mechanism is contained in the collet housing 51 portion of outer tube 56 and is the means by which index tube 26 is locked to hold the control rod at a selected position.

The collet assembly consists of a collet piston 29b fitted with four piston seal rings, two outer 28 and two inner 27, six fingers 29a and a retainer (not shown) and is set into a bore in the collet housing 51. In addition, a spring 31, barrel 35 and guide cap 39 complete the components installed in the collet housing 51.

Guide cap 39 is held in place above the collet by three plugs 37 which penetrate the upper end of collet housing 51, and which are held in place by fillister-head screws. It provides a fixed camming surface to guide collet fingers 29a upward and away from index tube 26 when unlocking pressure is applied to collet piston 29b. Barrel 35 is installed below guide cap 39 and serves as fixed seat for collet spring 31.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against guide cap 39. When the withdraw signal ceases, the spring pressure forces the collet downward so that fingers 29a slip off guide cap 39. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end. Both connections are secured in place by means of bands 25, 25' with tab locks.

There are 25 notches machined into the wall of index tube 26, all but one of which are locking notches 55 spaced at 6-inch intervals. The uppermost surfaces of these notches engage collet fingers 29a, providing 24 increments at which a control rod may be positioned and preventing inadvertent withdrawal of the rod from the core. The lower surfaces of the locking notches slope gradually so that the collet fingers cam outward for control rod insertion.

Drive piston 24 is provided with internal (62, 71, 72) and external seal rings (65), and is operated in the annular space between piston tube 15 and inner cylinder 57. Internal (63) and external (64) bushings prevent metal-to-metal contact between drive piston 24 and the surface of piston tube 15 and the wall of inner cylinder 57 respectively.

When a control rod is driven upward to its fully inserted position during normal operation or scram, the upper end of the piston head contacts the spring washers 30 which are installed below the stop piston 33. Washers 30 and stop piston 33 provide the upper limit of travel for drive piston 24. The spring washers, together with the series of buffer orifices 53 in the upper portion of piston tube 15, effectively cushion the moving drive piston 24 and reduce the shock of impact when the piston head contacts the stop piston.

The magnet housing, which comprises the lower end of drive piston 24, contains a ring magnet 67 which actuates the switches of the position indicator probe (not shown) to provide remote electrical signals indicating control rod position.

The piston tube assembly forms the innermost cylindrical wall of the CRD. It is a welded unit consisting of piston tube 15 and a position indicator tube 61. The piston tube assembly provides three basic functions for CRD operation: (a) position indicator tube 61 is a pressure-containing part which forms a drywell housing for a position indicator probe 12a (see FIG. 2A); (b) piston tube 15 provides for the porting of water to or from the upper end of the piston head portion of drive piston 24 during rod movement; and (c) during control rod scram insertion, buffer orifices 53 in piston tube 15 progressively shut off water flow to provide gradual deceleration of drive piston 24 and index tube 26.

A stud 59 is welded to the upper end of tube piston 15. Stud 59 is threaded for mounting the stop piston 33. A shoulder on the stud, just below the threaded section, is machined to provide a recess for the spring washers 30 that cushion the upward movement of drive piston 24.

The tube section 15a and head section 15b of piston tube 15 provide space for position indicator tube 61, which is welded to the inner diameter of the threaded end of head section 15b and extends upward through the length of tube section 15a, terminating in a watertight cap near the upper end of the tube section. Piston tube 15 is secured by a nut 16 at the lower end of the CRD. Two horizontal ports are provided in the head section 15b, 180° apart, to transmit water between the withdraw porting in the CRD flange and the annulus between indicator tube 61 and tube section 15a of piston tube 15 for application to the top of drive piston 24. Three O-ring seals 18 are installed around head section 15b. Two seal the bottom of the CRD against water leakage and one seals the drive piston 24 under-piston pressure from the drive piston over-piston pressure.

The position indicator probe 12a, which is slidably inserted into indicator tube 61, transmits electrical signals to provide remote indications of control rod position and CRD operating temperature. Probe 12a is welded to a plate 12b, which plate is in turn bolted to housing 12. Housing 12 is secured to the CRD ring flange 17 by screws 13. A cable clamp 11, located at the bottom of a plug 14, secures a connecting electrical cable (not shown) to plug 14. Ring flange 17 is in turn secured to the CRD housing by screws 9. Thus, probe 12a, housing 12 and cable clamp 11 (with the cables passing therethrough) can be removed as a unit.

The stop piston 33 threads onto the stud 59 at the upper end of piston tube 15. This piston provides the seal between reactor pressure and the area above the drive piston. It also functions as a positive-end stop at the upper limit of drive piston travel. Six spring washers 30 below the stop piston help absorb the final mechanical shock at the end of travel. Seals 34 include an upper pair used to maintain pressure above the drive piston during CRD withdrawal and a lower pair used only during the cushioning of the drive piston at the upper end of the stroke. Two external bushings 32 prevent metal-to-metal contact between stop piston 33 and index tube 26.

As seen in FIG. 3, spud 46, which connects the control rod 90 and the CRD, is threaded onto the upper end of index tube 26 and held in place by locking band 44. The coupling arrangement will accommodate a small amount of angular misalignment between the CRD and the control rod. Six spring fingers permit the spud to enter the mating socket 92 on the control rod. A lock plug 94 then enters spud 46 from socket 92 and prevents uncoupling.

Two uncoupling means are provided. The lock plug 94 may be raised against the return force of a spring 95 by an actuating shaft 96 which extends through the center of the control rod velocity limiter to an unlocking handle 98. The control rod, with lock plug 94 raised, may then be lifted from the CRD. The lock plug may also be raised from below to uncouple the CRD from below the reactor vessel. To accomplish this, a special tool is attached to the bottom of the CRD and used to raise the piston tube 15 (see FIG. 2B). This raises the uncoupling rod 48, lifting lock plug 94 so that spud 46 disengages from the control rod coupling socket 92.

The uncoupling rod consists of a rod 48 and a tube 43, supported in the base of the spud at the upper end of the CRD. The rod 48 is welded to the flared end of tube 43 such that a dimension of 1.125 inch exists between the top of rod 48 and the top end of spud 46. This is a critical dimension and must be maintained to ensure proper CRD and control-rod coupling. For this reason, uncoupling rods cannot be interchanged unless the critical dimension is verified. In addition to its function in uncoupling, rod 48 positions the control rod lock plug 92 such that it supports (i.e., opposes radially inward deflection of) the spud fingers when the control rod and CRD are coupled.

An outer filter 45 and the inner filter 41 are installed near the upper end of the CRD. The outer filter is mounted on guide cap 39 using screws 40. A center lug 44 at the top of stop piston 33 is provided for mounting inner filter 41. The inner filter is held in place by a spring clip 42 which grips lug 44. Both filters are provided to filter reactor water flowing into the CRD, removing foreign particles or abrasive matter that could result in internal damage and excessive wear. Strainer 36, which is secured by screws 5, reduces the entry of coarse foreign particles from reactor water into the scram ports and ball-check valve in the CRD flange in the event such particles penetrate or bypass the outer filter 45. The inner filter is sealed by means of a seal ring 50 installed in a groove in the outer circumferential surface of the inner filter ring.

During maintenance of a CRD, the uncoupling rod and spud are removed. During re-assembly of the control rod drive, the spud and uncoupling rod are re-installed. Incorrect installation of the uncoupling rod is a major cause of inadvertent control rod coupling/uncoupling problems.

SUMMARY OF THE INVENTION

The present invention is a gauge for ensuring that the uncoupling rod of the control rod drive of a nuclear reactor is properly inserted in the center hole of the spud and not in any of the outer lobes, i.e., spud flow holes, which communicate with the center hole. The uncoupling rod is inserted in the center hole of the spud. Then the gauge is placed on top of the spud with a centering ring protruding into the spud. The uncoupling rod is correctly installed if it is free to slide inside the gauge and the spud. The gauge is also provided with a ring to protect the spud during transfer, and to check the diameter of the spud fingers and their concentricity to assure the spud fingers have not been damaged.

DETAILED DESCRIPTION OF THE PREFERRED EMBODIMENTS

Figure 1:
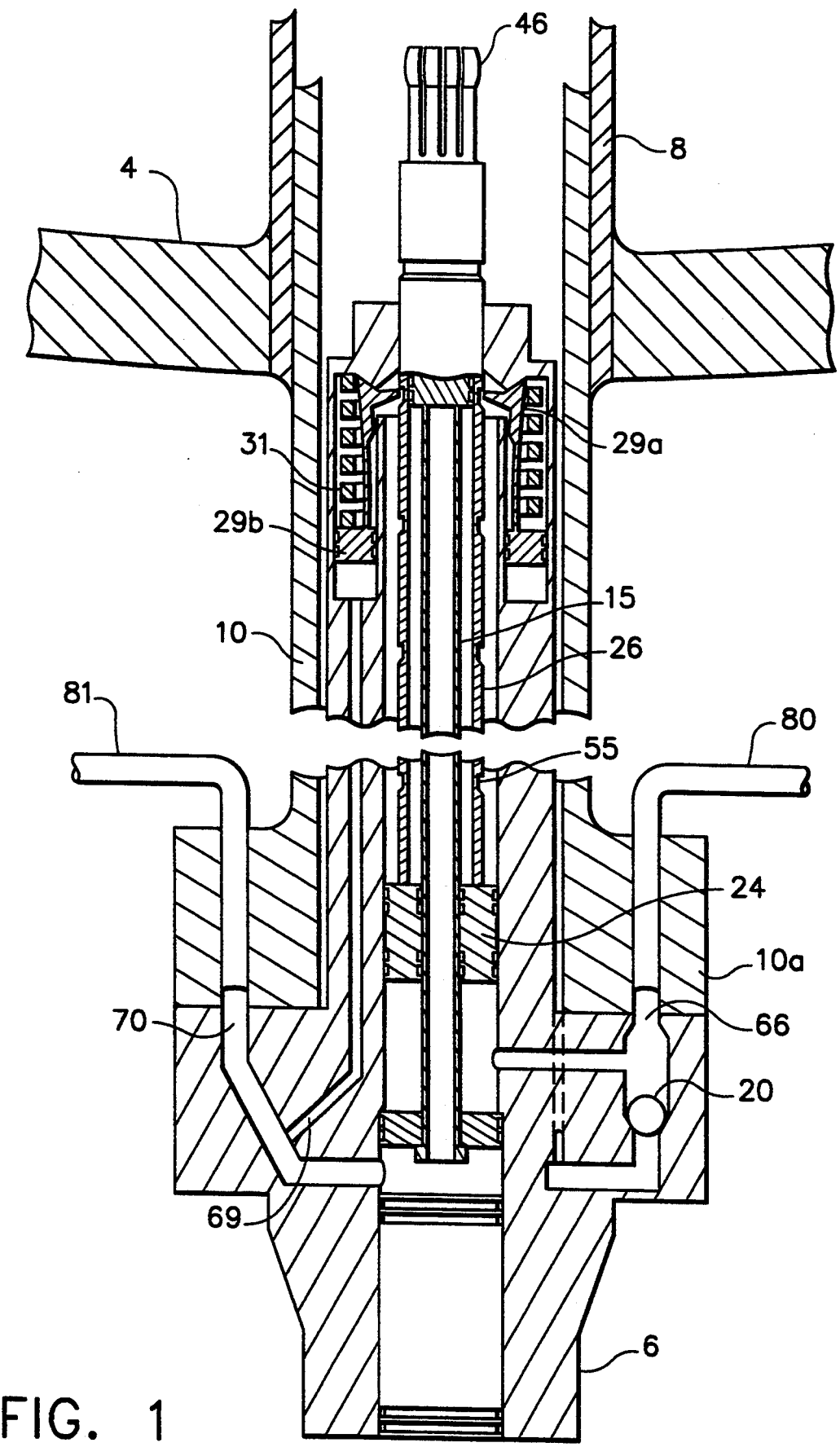
FIG. 1 is a sectional schematic of a conventional control rod drive installed in a BWR.
Figure 2A:
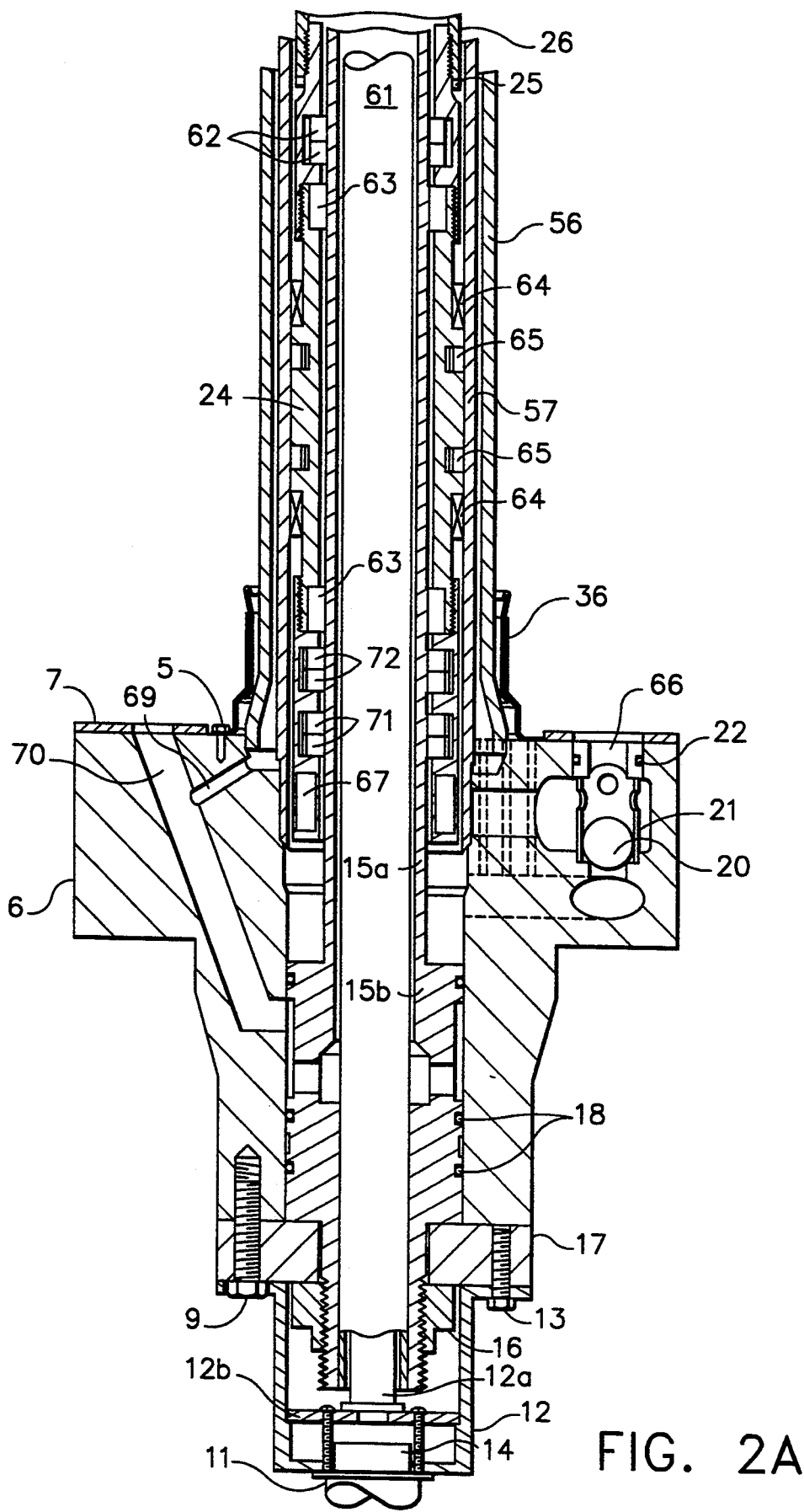
FIGS. 2A and 2B are sectional views of the lower and upper portions respectively of a conventional control rod drive.
Figure 2B:
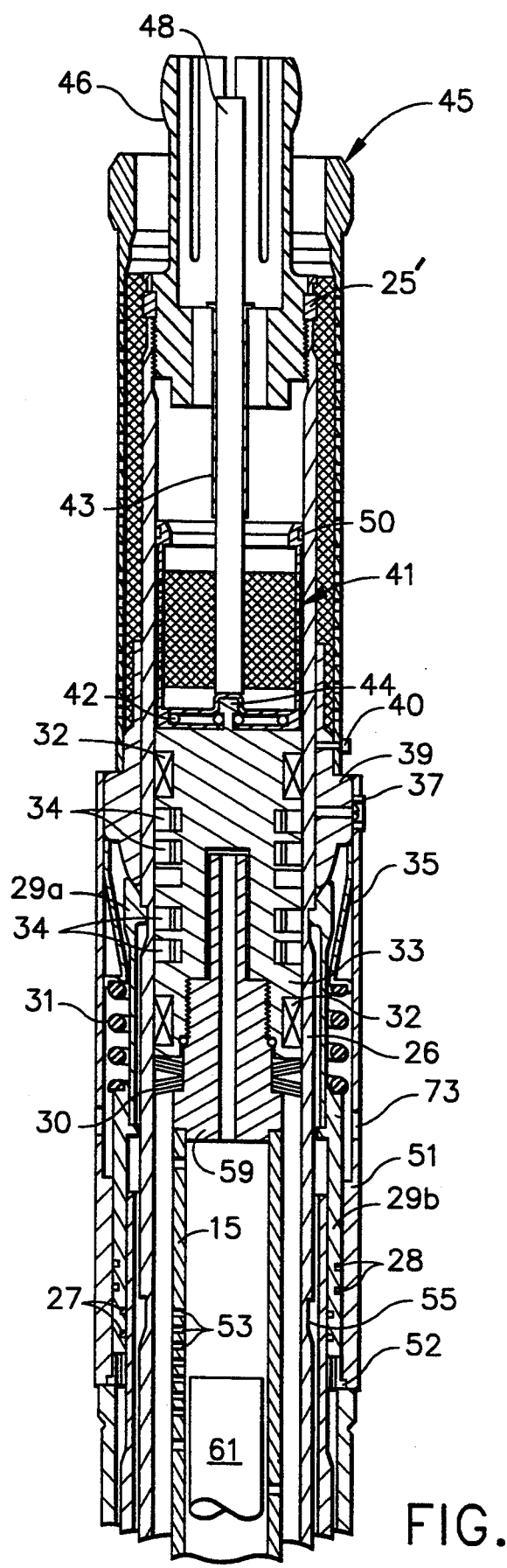

In accordance with a preferred embodiment of the invention (see FIGS. 3 and 4), the uncoupling rod centering gauge 100 comprises a platelike cross handle 102 having a generally square-shaped central portion and four arms 102a–102d extending therefrom. The arms are disposed at right angles relative to each other. The arms are sized such that the gauge cannot be inadvertently left in when reinstalling the CRD after maintenance.

The central portion of cross handle 102 further has a pair of concentric rings 104, 106 welded to bottom surface and extending downward. Cross handle 102 sits atop spud 46 with guide ring 104 surrounding the fingers of spud 46 and with centering ring 106 projecting inside the spud. Centering ring 106 has an outer circumferential surface which provides support for the fingers on the inside of the spud by blocking radially inwardly directed flexure of the spud fingers. The annulus between rings 104 and 106 is dimensioned such that the spud fingers reside therein in a flexed state, the return spring force of the spud fingers acting to grip the centering ring 106, whereby the gauge 100 is held securely in place atop the spud. This process ensures that the spud fingers have not been damaged and are concentric.

Centering ring 106 further has a circular cylindrical centering bore 108, which continues through cross handle 102. The diameter of centering bore 108 is slightly greater than the diameter of rod 48 of the uncoupling rod. When the uncoupling rod centering gauge is correctly seated atop the spud, free axial movement of rod 48 inside centering bore 108 indicates that the uncoupling rod is correctly installed in the spud.

Figure 5:
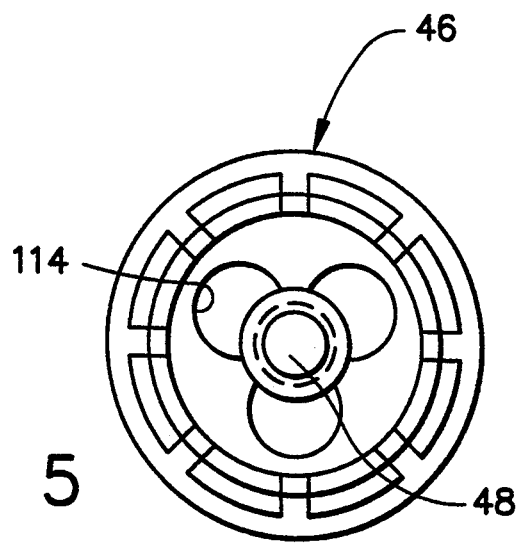
FIG. 5 is a top view of a conventional spud showing the hole configuration in the spud.

As shown in FIG. 5, the spud 46 has a clover-leaf shaped through-hole consisting of a central hole for receiving the uncoupling rod 48 (which is welded inside tube 43) and three lobes 114, commonly referred to as the "spud flow holes". The spud flow holes are arranged to intersect the central hole at equal angular intervals along the periphery thereof. The radius of each spud flow hole 114 is slightly greater than the radius of center hole. Since the diameter of tube 43 of the uncoupling rod is such that it fits snugly inside the center hole, it is true, albeit undesirable, that the uncoupling rod also fits inside any one of the spud flow holes. Thus, incorrect installation of the uncoupling rod is possible.

Figure 3:
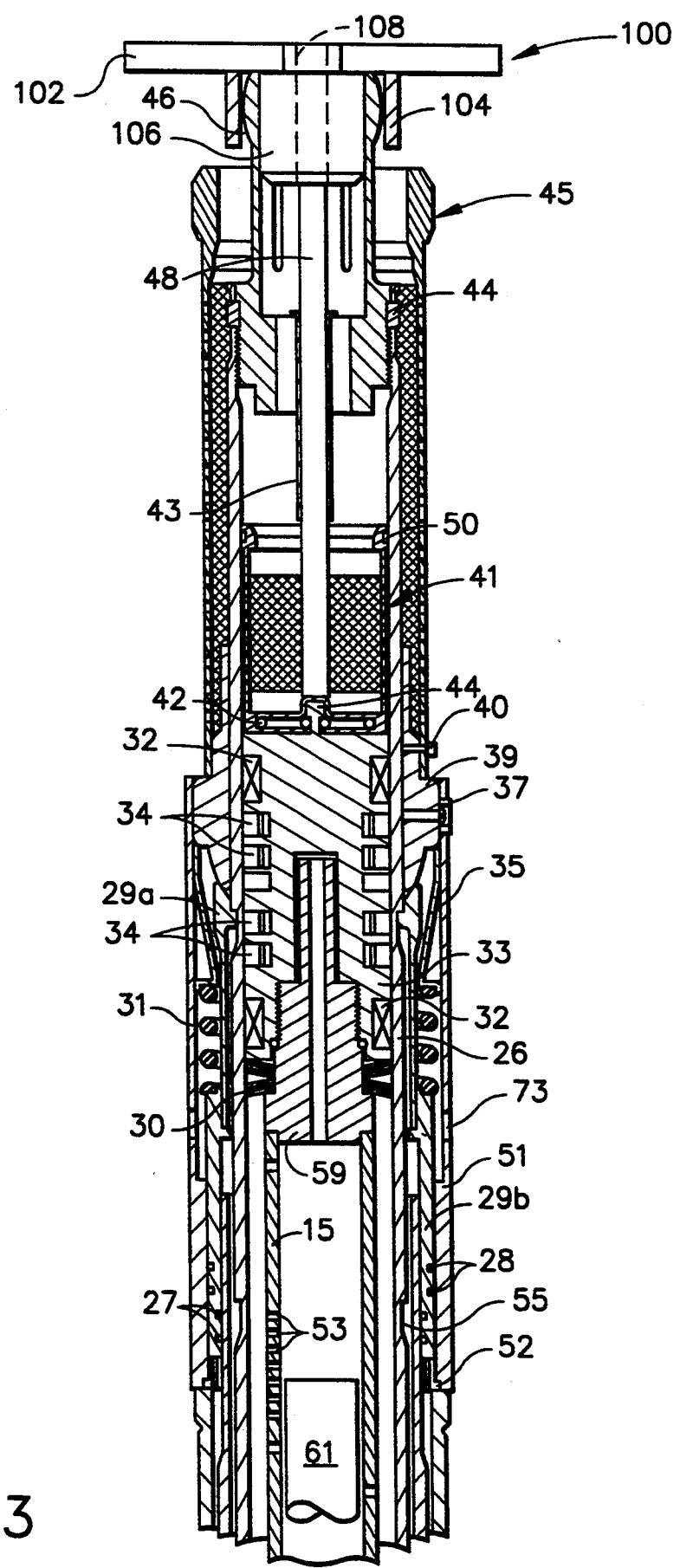
FIG. 3 is a sectional view of the upper portion of a conventional control rod drive with the uncoupling rod centering gauge of the invention installed.
Figure 4:
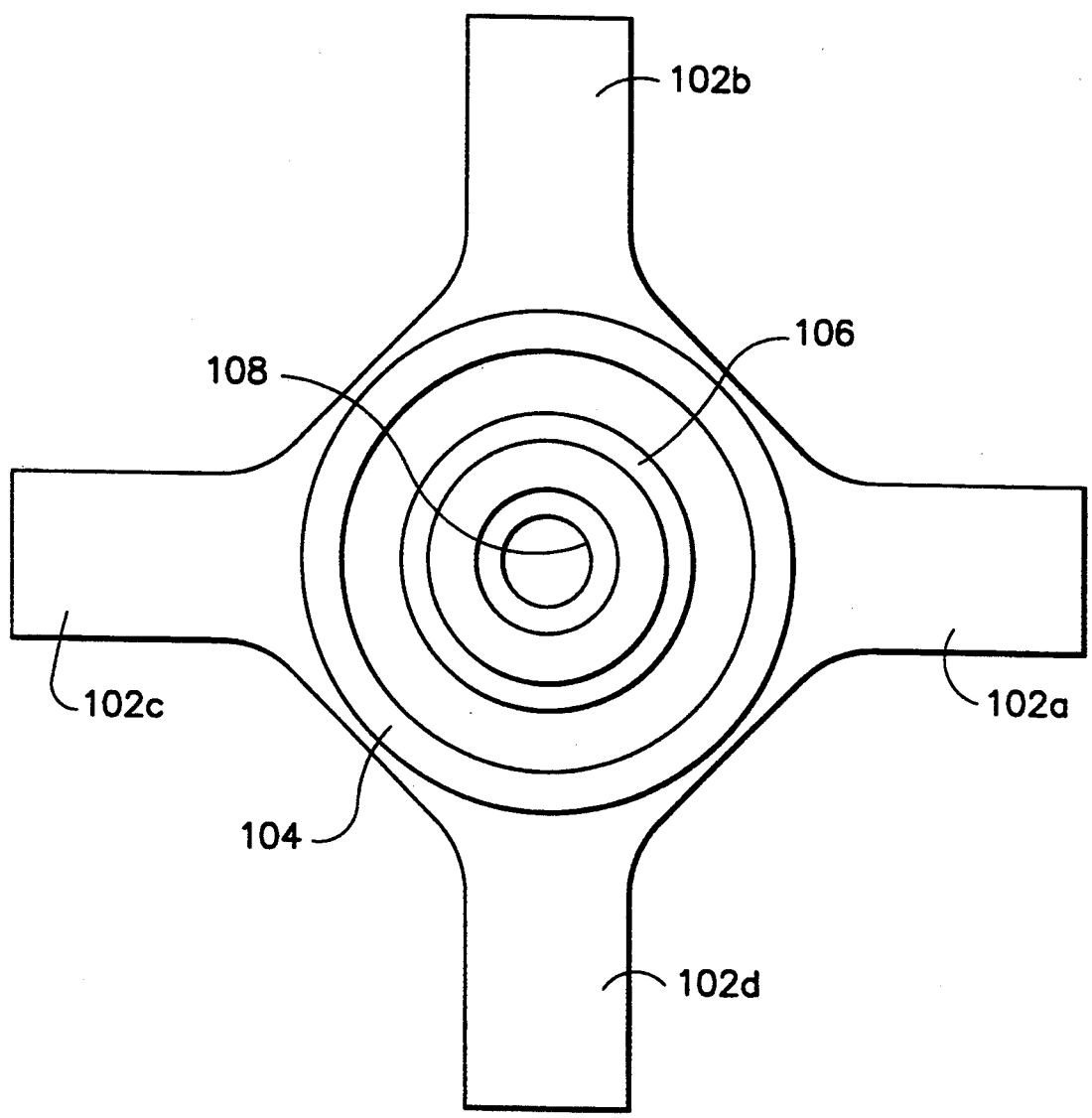
FIG. 4 is a top view of view of the uncoupling rod centering gauge in accordance with the invention.

The gauge of the present invention is designed to ensure correct installation of the uncoupling rod. The gauge is mounted on the spud after the uncoupling rod has been inserted. FIG. 3 shows an uncoupling rod (consisting of rod 48 and tube 43 welded together) which has been correctly inserted in the center hole 112 of spud 46. In this case, the uncoupling rod is free to slide up and down in the centering bore 108 of gauge 100 without binding. In the event that the uncoupling rod had been mistakenly inserted in one of the spud flow holes, binding of rod 48 inside centering bore 108 would occur, indicating incorrect installation. The gauge would then be removed and the uncoupling rod would be withdrawn from the spud flow hole and then re-inserted into the center hole of the spud.

After assembly is complete, the CRD must be transported to the under vessel area. In the assembled state, spud 46 protrudes from the outer filter 45, exposing it to possible damage during CRD transport. Therefore, it is desirable to leave the uncoupling rod centering gauge 100 in place to protect the spud during transfer.

The uncoupling rod centering gauge in accordance with the preferred embodiment of the invention has a cross handle for ease in handling. The outer perimeter of the gauge as defined by the ends of radially outwardly projecting arms 102a–102d has a radius such that the CRD cannot be installed inside the reactor if the gauge has not been removed from the spud.

The preferred embodiment of the uncoupling rod centering gauge has been disclosed for the purpose of illustration. Variations and modifications of the disclosed structure which do not depart from the concept of this invention will be readily apparent to mechanical engineers skilled in the art of tooling. All such variations and modifications are intended to be encompassed by the claims set forth hereinafter.

We claim:

1. A gauge for checking that an uncoupling rod of a control rod drive is inserted in a center hole of a spud, comprising a platelike cross handle having a central portion and a plurality of arms extending radially outwardly therefrom, and a first cylindrical ring having one end connected to a bottom surface of said central portion of said cross handle and extending axially downward, said first cylindrical ring having a first axial cylindrical hole of predetermined diameter and said central portion of said cross handle having a second axial cylindrical hole of said predetermined diameter, said first circular cylindrical ring being positioned so that said first and second cylindrical holes have collinear axes.

2. The gauge as defined in claim 1, wherein the number of said arms is four, said arms extending radially outwardly from said central portions at angular intervals of 90°.

3. The gauge as defined in claim 1, further comprising a second cylindrical ring having one end connected to said bottom surface of said central portion of said cross handle and extending axially downward, said second cylindrical ring having an inner diameter greater than an outer diameter of said first cylindrical ring, said first and second cylindrical rings being arranged concentrically with an annular space therebetween.

4. The gauge as defined in claim 3, wherein said annular space has a width such that the fingers of a spud of a control rod drive can be received therein.

5. The gauge as defined in claim 1, wherein said predetermined diameter is greater than the diameter of an uncoupling rod of a control rod drive.

6. A gauge for checking that an uncoupling rod of a control rod drive is inserted in a center hole of a spud, comprising:
   support means having a planar bottom surface;
   means for receiving said uncoupling rod having one end connected to said bottom surface of said support means and extending axially downward; and
   means for centering said uncoupling rod receiving means relative to said center hole of said spud, said centering means being connected to said support means.

7. The gauge as defined in claim 6, wherein said support means comprises a platelike cross handle having a central portion and a plurality of arms extending radially outwardly therefrom.

8. The gauge as defined in claim 7, wherein the number of said arms is four, said arms extending radially outwardly from said central portions at angular intervals of 90°.

9. The gauge as defined in claim 7, wherein said uncoupling rod receiving comprises an axial cylindrical hole of predetermined diameter formed in a first cylindrical ring, said first cylindrical ring having one end connected to said bottom surface of said support means and extending axially downward, and said centering means comprises a circular cylindrical outer surface of said first cylindrical ring.

10. The gauge as defined in claim 9, wherein said predetermined diameter is greater than the diameter of said uncoupling rod.

11. The gauge as defined in claim 9, further comprising a second cylindrical ring having one end connected to said bottom surface of said support means and extending axially downward, said second cylindrical ring having an inner diameter greater than an outer diameter of said first cylindrical ring, said first and second cylindrical rings being arranged concentrically with an annular space therebetween.

12. The gauge as defined in claim 11, wherein said annular space has a width such that the fingers of said spud can be received therein.

13. A method for checking that an uncoupling rod of a control rod drive is inserted in a center hole of a spud mounted on an index tube, comprising the steps of:
   mounting a gauge having a cylindrical bore of predetermined diameter greater than the diameter of said uncoupling rod at a position so that said cylindrical bore is centered over said center hole; and
   lowering said index tube until the top end of said installed uncoupling rod is at a predetermined elevation higher than a bottom end of said cylindrical bore, said uncoupling rod being correctly installed if said top end is freely inserted in said cylindrical bore as said index tube lowers.

* * * * *